US009385980B2

(12) United States Patent
Homsany et al.

(10) Patent No.: US 9,385,980 B2
(45) Date of Patent: Jul. 5, 2016

(54) AUTOMATIC ROUTING OF ELECTRONIC MAIL FILE ATTACHMENTS TO A USER DIRECTORY IN A FILE MANAGEMENT SYSTEM, BY A RECIPIENT ELECTRONIC MAIL SERVER, BASED ON EMAIL SENDER DEFINED PROCESSING RULES

(71) Applicant: Dropbox, Inc., San Francisco, CA (US)

(72) Inventors: Ramsey Homsany, San Francisco, CA (US); Ilya Fushman, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 278 days.

(21) Appl. No.: 13/725,875

(22) Filed: Dec. 21, 2012

(65) Prior Publication Data

US 2014/0181223 A1 Jun. 26, 2014

Related U.S. Application Data

(60) Provisional application No. 61/706,622, filed on Sep. 27, 2012.

(51) Int. Cl.
*G06F 13/00* (2006.01)
*H04L 12/58* (2006.01)

(52) U.S. Cl.
CPC ..................... *H04L 51/08* (2013.01)

(58) Field of Classification Search
CPC .... G06Q 10/107; H04L 12/585; H04L 12/58; H04L 12/581; H04L 12/5855; H04L 51/08
USPC .......................................................... 709/206
See application file for complete search history.

(56) References Cited

U.S. PATENT DOCUMENTS

| | | | |
|---|---|---|---|
| 6,839,741 B1 * | 1/2005 | Tsai .............................. | 709/217 |
| 7,054,905 B1 * | 5/2006 | Hanna et al. .................. | 709/206 |
| 2005/0091324 A1 * | 4/2005 | Flocken ........................ | 709/206 |
| 2007/0136328 A1 * | 6/2007 | Carro ........................... | 707/100 |
| 2008/0016160 A1 * | 1/2008 | Walter et al. .................. | 709/206 |
| 2010/0306330 A1 * | 12/2010 | Friedman et al. ............. | 709/206 |

* cited by examiner

*Primary Examiner* — Robert B Harrell
(74) *Attorney, Agent, or Firm* — Polsinelli PC

(57) ABSTRACT

Attachments received at an email account are processed according to a processing rule that is selected using, for example, a sender's email address, the sender's domain, or metadata in the email. A feature triggers the processing rule that then removes the attachment from the received email and stores the attachment in a rule-indicated directory. Processing rules can be defined by the email sender or by the email recipient. Changes to the attachment can be synchronized across multiple user devices and user accounts using a file sharing application.

20 Claims, 3 Drawing Sheets

AUTOMATIC ROUTING OF ELECTRONIC MAIL FILE ATTACHMENTS TO A USER DIRECTORY IN A FILE MANAGEMENT SYSTEM, BY A RECIPIENT ELECTRONIC MAIL SERVER, BASED ON EMAIL SENDER DEFINED PROCESSING RULES

CROSS-REFERENCE TO RELATED APPLICATIONS

This application claims the benefit of U.S. Provisional Patent Application No. 61/706,622, entitled "AUTOMATIC ROUTING OF ELECTRONIC FILE ATTACHMENTS", filed on Sep. 27, 2012, and which is hereby expressly incorporated herein by reference in its entirety.

TECHNICAL FIELD

The disclosed embodiments relate generally to sharing data over a network using a file management system. In particular, the disclosed embodiments are directed to automatically routing electronic file attachments.

BACKGROUND

Many individuals and businesses have replaced physical mail with email. Attachments to email are often used to communicate information that is sent on a predictable schedule or from an expected correspondent. These attachments are used because they can generally convey complexly structured information (e.g., documents, spreadsheets, presentations, videos, etc.) that cannot be readily communicated in the body of an email. Attachments are also useful for communicating documents produced by business and enterprise systems. This is particularly helpful when presenting a consumer with a bill or invoice for a rendered commercial transaction.

While it can be convenient to send information via an attachment to an email, it can be less convenient for the recipient to receive information in this way. The sources of email are legion, originating from businesses, personal correspondents, social media systems, advertisers, marketers, and others. This leads to email accounts receiving enormous amounts of email every day, quickly overwhelming the ability of a user to identify those emails having an attachment and requiring a response.

SUMMARY

Embodiments of the disclosure include methods and systems for using electronic communication ("email") attachments to transfer files from a sender to a recipient using a file management system, rather than directly transferring the file. In one embodiment, a file management system is configured to provide users with file directories by which they can upload and share files with other users. The file management system includes a mail server that can receive an email having an attachment, the email being sent from a sender to a recipient-user ("user") having an account with the file management system. An email attachment manager receives the email from the mail server and is configured to automatically apply an attachment processing rule by which to store the attachment in a target file directory associated with the user of the system. The processing rule is selected according to the metadata associated with the email. In one embodiment, each sender provides the attachment processing rule (or rules) applied to emails it sends to users. Examples of metadata used to trigger a processing rule include the author or sender of the email, the domain from which the email is sent, tags included in the subject line or body of the email, and the file type of the attachment.

Other embodiments include a system and a non-transitory computer-readable storage medium for processing email attachments in the manner described above. A file management computer system embodiment includes a computer processor, a user account database module configured to store a plurality of user directories, where each user directory is associated with a user having an account on the file management computer system. An email server module is configured to receive an email having an attachment from an email sender addressed to at least one user having an account on the file management computer system. An email attachment manager module is configured to store processing rules for processing email attachments. The processing rules include sender-defined rules provided by at least one email sender. The email attachment manager is further configured to select at least one sender-defined processing rule based upon the email sender of the received email, and process the email according to selected sender-defined processing rule to determine a target directory in the user's account in which to store the attachment included with the email. The email attachment manager then stores the attachment in the determined target directory in the user's account.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
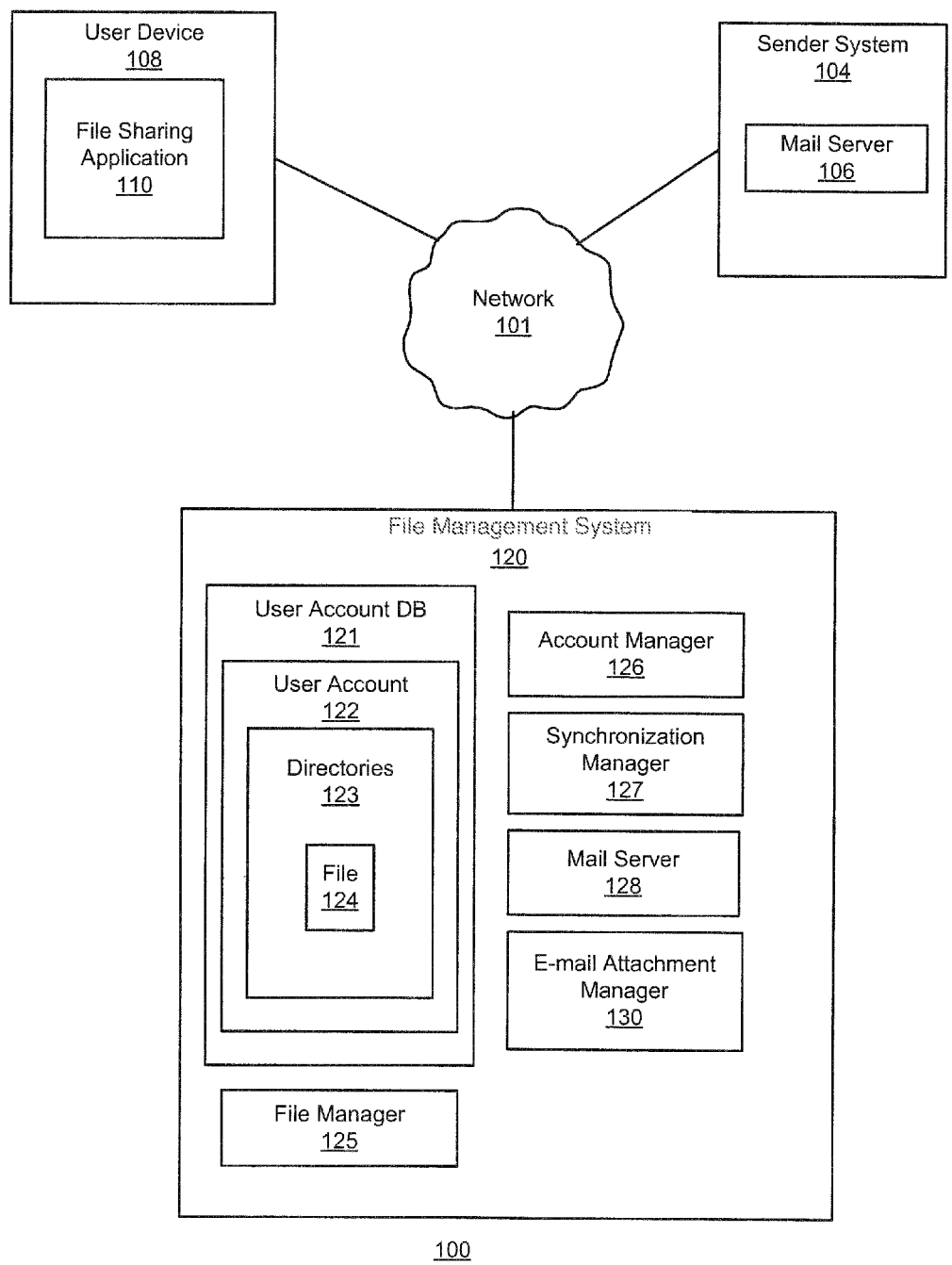
FIG. 1 is a block diagram of a system environment according to one embodiment.

FIG. 1 illustrates a computing environment 100 used for receiving and saving emailed attachments in a file directory according to sender-defined or user-defined processing rules. The computing environment includes a network 101, a sender system 104, a user device 108, and a file management system 120.

The network 101 represents the communication pathway between the sender system 104, the user device 108, and the file management system 120. In one embodiment, the network 101 uses standard Internet communications technologies and/or protocols. Thus, the network 101 can include links using various communication models, such as protocols and standards consistent with the OSI model, including various layers such as physical, data link, network, transport, session, presentation, and application layers.

The data exchanged over the network 101 can be represented using any file format, including without limitation, a wide variety of text document formats, audio file formats, and image file formats. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

The sender system 104, which includes a mail server 106, is instantiated on a server grade computer system using any appropriate hardware for performing file serving and storage, and is used for the distribution of attachments via email to the file management system 120.

User device 108 is used to access attachments and other stored files in the file management system 120 through the network 101 using a file synchronizing application 110 that is stored as an application on the user device. For purposes of clarity only a single user device 108 is shown, but in practice there will be any number of user devices 108. Examples of user devices include a desktop computer, a laptop computer, a tablet computing device, and a handheld computing device such as a personal digital assistant or a smart phone. Examples of the file sharing application 110 include web browsers or specific applications that access the file management system 120, thereby providing user access to the attachments stored therein. The file sharing application 110 on the client device 108 communicates designated attachments or files to the file management system 120. The file management system 120 in turn communicates the attachments or files to other user devices (not shown) either by "pushing" the attachments to the clients or by enabling the other user devices to "pull" the attachments from the file management system. The cooperation of the user devices 108 with the file management system 120 thereby permits attachments initially acquired or altered on the user device 108 to be propagated to all user devices in communication with the file management system 120.

The file management system 120 is generally configured for a user to store files in a directory structure that is persistently represented and synchronized across multiple user devices 108. Examples of the multiple user devices 108 can include the user's business computer, the user's personal computer, and the user's smartphone. Files stored to a user's directory are synchronized across those devices associated with the user's file management system account 122. A user can also share files and directories with other users.

In the context of this disclosure, the file management system 120 is configured to receive emails with attachments sent from the mail server 106 of the sender system 104. As described below, the emails and attachments are processed according to processing rules (described in more detail in the context of FIG. 2), and stored in a directory that is accessible by the user device 108 using the file sharing application 110. The file management system 120 (as well as the sender system 104) is comprised or one or more computers, preferably server-grade computers, including one or more high-performance CPUs (processors) and 1 G or more of main memory, as well as 500 Gb to 2 Tb of computer readable, persistent storage, and running an operating system such as LINUX or variants thereof. The operations of the system 120 as described herein are controlled through both hardware and computer programs executed by the processor(s) to perform the functions described herein. The system 120 includes other hardware elements used in the operations described here— including network interfaces and protocols, input devices for data entry, and output devices for data presentation—that are known to those of skill in the art but not germane to this description, and which thus are omitted for clarity. As will be apparent from the following description, the operations and processes described herein for the user device 108 and system 120 necessarily require the operation of a computer system, and cannot be performed merely as mental steps in the human mind.

In one example, to accomplish the above described functions, the file management system 120 includes a user account database 121, a file manager 125, an account manager 126, a synchronization manager 127, a mail server 128, and an email attachment manager 130.

The user account database 121 stores user account credentials and the files and attachments associated with a particular user. The user credentials are used to identify a user account 122 and associate the account with a user. Registering for an account 122 gives users access to the file management system 120 for creating directories 123 and storing files 124 therein. Upon registration, users also obtain a specific email address associated with the file management system 120. This specific email address is used by the user to receive emails at the file management system 120 sent from senders. For example, user John Doe may obtain an account 122, and have an associated email, JohnDoe@fileaccess.com, to which senders can direct emails with attachments. In one embodiment, the mail server 128 of the file management system 120 is configured so that this associated user email address is used only for receiving emails and attachments, and not used for sending emails. However, in another embodiment, the mail server 128 is configured so that the user can also send emails (with an attachment if desired) from the file management system 120, in which case the user can access the mail server with a mail client application.

The plurality of directories 123 or folders within a user account 122 are used to store attachments that are included in emails sent to the user. The underlying storage architecture of these directories 123 need not physically correspond to the directories as shown to the user, but instead may be implemented to maximize storage efficiency. Storage efficiency can be maximized by, for example, using various relationship, object, or key-value database architectures; thus the structure of the directories can be virtual from the point of view of the user account database 121, even as the directories 123 appear and operate as physical directories when presented to the user on the user device 108.

The file manager 125 manages the various manipulations of the directories 123 and the files 124. For example, the file manager 125 enables a user (or even a sender) to create, name, move, and/or delete both directories 123 and files 124. The file manager 125 performs these functions as instructed directly by a user or by the processing rules triggered by receipt of an email, as described in more detail below.

The account manager 126 manages the various preferences and permissions for each folder. These preferences and permissions include, for example, identifying which sender systems 104 are permitted to send emails and attachments to the user account 122, and which user devices 108 are permitted to access the user account. Other preferences include identifying blocked senders and users, creating and/or tailoring the names of directories 123, nesting various directories 123, and determining when to notify a user of a newly received attachment or file 124.

The synchronization manager 127 enables files 124 stored within the file management system 120 to be synchronized across multiple user devices 108 using a synchronization application. The synchronization manager 127 enables an attachment received by the file management system 120 to be replicated across multiple user devices 108. Furthermore, upon changing one of the replicated attachments, the synchronization manager 127 replicates the change across all copies of the attachment. Provided the appropriate permissions have been granted using the account manager 126, the multiple user devices 108 can even include devices not associated with the user of the user account 122. This enables multiple parties to receive, view, and modify an attachment stored on the file management system 120 and have the changed document distributed by the synchronization manager 127. One embodiment of the synchronization manager 127 is a service commercially known as DROPBOX.

Emails addressed to the user account 122 within the file management system 120 are received by the mail server 128. The mail server 128 includes any server-grade computer operating a mail server application, such as MICROSOFT EXCHANGE, POP3, SMTP, and others. The mail server 128 is in communication with the email attachment manager 130.

The email attachment manager 130 stores a set of processing rules used to process emails and attachments. When an email with an attachment is received, the mail server 128 passes the email to the email attachment manager 130. In one embodiment, emails received without attachments are discarded, returned, or rerouted. The email attachment manager 130 selects a processing rule by which to process the received email and attachment. Once the processing rule is selected, the email attachment manager 130 processes the email and the attachment according to the selected rule in order to store it in a particular user account 122 and target directory 123. As will be apparent from the following description, the operations and processes described herein necessarily require the operation of a computer system, and cannot be performed merely as mental steps in the human mind.

Figure 2:
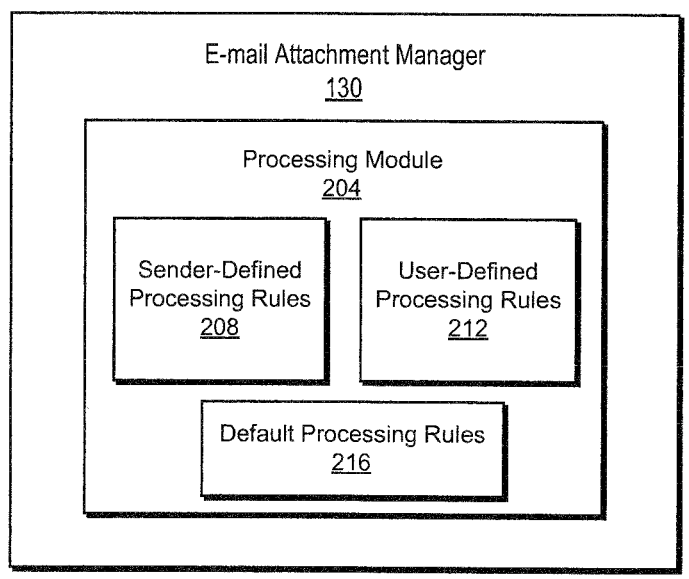
FIG. 2 is a block diagram illustrating the components of an attachment module of a file management system, according to one embodiment.

FIG. 2 illustrates one embodiment of the email attachment manager 130 that operates as part of the file management system 120. In this embodiment, the email attachment manager 130 includes a processing module 204, within which are sender-defined processing rules 208 and user-defined processing rules 212.

The processing module 204 of the email attachment manager 130 performs several functions. Upon notification by the mail server 128 that a new email with an attachment has been received, the processing module 204 tests the received email against sender-defined processing rules 208 and user-defined processing rules 212. These rules are explained in more detail below. Upon determining the proper rule to apply to the attachment, the processing module 204 selects a rule, removes the attachment from the email and stores it in the appropriate user account 122 and target directory 123 as indicated by the rule. This process is described below in more detail.

During the execution of a sender-defined processing rule 208, the processing module 204 identifies the proper user account 122 to route the processed attachment to by, for example, using the email address to which the email was sent. The execution of the sender-defined processing rule 208 and/or the user-defined processing rule 212 then identifies the appropriate target directory 123 within the identified user account 122 in which to store the attachment.

Within the processing module 204, processing rules—whether sender-defined or user-defined—follow the same general process of a) testing the received email for a match with one or more conditions specified in the rule and b) upon matching the email with the conditions met, storing the attachment in a specified directory 123 of the user account 122. The conditions are tested using metadata associated with the received email. The processing module 204 selects the appropriate set of processing rules based on the email address and/or domain of the sender, thereby ensuring that an email from one sender is not processed using the processing rules of a different sender.

As mentioned above, two broad categories of processing rules include sender-defined processing rules 208 and user-defined processing rules 212. A sender creates sender-defined processing rules 208 by using an application programming interface ("API") that is exposed by the email attachment manager 130. Using the API, the sender defines the processing rules which are applied to all emails sent from the mail server 106 of the sender system 104 to the mail server 128 of the file management system 120 to route or store the attachments to within a particular user account 122 in the database 121. Any number of senders can establish processing rules for use by the file management system 120.

One useful set of processing rules are those for handling attachments based on the sender's email address or domain of origin. This is particularly useful for senders that provide invoices and monthly billing statements to consumers as email attachments. Generally, email addresses from senders take the form of sender_name@sender_domain. Either the sender_name or the sender_domain portion can be used to define a processing rule. For example, a utility company named "ABC Utility" can define a rule that an email received from the domain "abc-utility.com" and addressed to "user-X@filesystem.com" will have its attachment saved to a folder entitled "ABC Utility Bills" in user-X's file directory 123 in the file management system 120. The benefit of this approach is that a single rule set up by the sender operates to handle all emails sent from the sender to all of its customers (users), thereby eliminating the need for every individual user to set up a user-defined rule 212 in his or her email system. Thus, the system administrator for ABC Utility can set up a single rule that will be used to process emails for potentially thousands (or even millions) of customers, without requiring such customers to set up any rules at all.

Sender-defined processing rules 208 can specify the target directory 123 to which the attachment is to be stored in several different ways. In one example, the target directory 123 is fixed by naming a specific directory 123 (e.g., "Utility Bills"). Or, in another example, the rule 208 can specify a variable target directory 123, wherein the name of the variable target directory is determined based upon a tag or other metadata of the email or attachment. In one embodiment of this example, the target directory is specified by providing a tag (e.g., a keyword) in the subject line or body of the email triggering a corresponding rule. That is, "Annual Summary" can be provided in the subject line or body of the email thereby specifying that the attachment be saved in the Annual Summary directory 123 of the user's account. Similarly, a keyword used in the file name of the attachment sent can specify the directory (e.g. "Monthly Statement/June"), as well as using the entire file name. In yet another embodiment of this example, the directory 123 is specified by the file type of the attachment. This embodiment uses a lookup relationship to map the file type to a directory 123 (e.g., .PDF files are stored in the "Acrobat Files" directory, .doc files are stored in the "Word Files" directory, etc.).

Another way in which the target directory can be specified is through the use of "plus addressing." In "plus addressing," an email address has the form username+targetdirectory@domain.com. The "plus" symbol is typically recognized by a mail server as an invalid character in an email address, and the following characters are normally ignored. Here, the characters following the "+" sign in the email address of the user receiving the email attachment specifies the name of the target directory. A sender may also define multiple target directories in the user's account for storing the attachments.

The processing module 204 determines whether the specified target directory 203 exists in the user account, and if not the processing module 204 can create the directory consistent with the sender-defined rule 208, and name the directory accordingly, and then store the attachment to the directory.

In some embodiments, sender-defined processing rules 208 are used to set several conditions, for example indicating a new directory is to be created within an existing directory 123 for a user account 122. This can be accomplished, for example by using a tag in a subject line of an email or in the body of an email. Examples of tags include a user ID number associated with a service or financial account (e.g., a utility customer account, a mobile phone number, a physical address of the user, etc.) or a phrase that is expected in the email or attachment. In other embodiments, a condition to create a new directory is met using the file type of the attachment or the title of the attachment. In this later case, illustrations of expected phrases that trigger processing include "annual summary," "quarterly report," and other similar phrases suggesting that a timely response is requested or that the attachment is not one routinely sent. Upon the processing module 204 determining that one of these processing rules 208 is met, the processing module can create, rename, or restructure the directories 123 in the user account 122. Similarly, the sender can set up rules that are based on the file type of the attachment. For example, the sender can set up a rule by which PDF files are stored to a directory named "Sender's PDF's." Finally, the sender can set up rules that select the target directory The user-defined processing rules 212, as with the sender-defined processing rules 208, generally have the previously described process of a) testing the received email for compliance with a condition and b) upon determining that the condition is met, storing the attachment in a specified directory 123. Users can thus save attachments from various senders to a preferred directory by defining a storage path indicating the directory 123 and or sub-directories in which the received attachment is to be stored.

The user-defined processing rules 212 may also be used to relocate attachments saved according to a sender-defined processing rule 208. For example, as an email is tested according to the conditions of a sender-defined processing rule 208, the processing module 204 can also test the email for conditions of a user-defined rule 212. For example, upon execution of the sender-defined processing rule 208, the attachment is first saved in the designated directory. Then, the processing module 204 further applies the user-defined processing rule 212 in order to relocate the attachment to the user-defined directory. In this way, the sender-defined processing rules 208 still functions as defined, but the ultimate location of the attachment is determined by the user rules 212.

In some cases, a sender-defined rule 208 and a user-defined rule 212 may conflict regarding the proper location in which to save an attachment. For example, a sender from given domain may define a rule to store an attachment to a directory named "Bills", whereas the user may have defined a rule to store attachments in emails from that sender to a directory named "Things I have to do". Conflicts such as these can be resolved by the email processing module 204 applying a conflict resolution rule. Examples of these resolution rules include, for example, preferentially selecting a sender-defined rule, a user-defined rule, the most recently entered rule, or avoiding the conflict entirely by saving the attachment and at least one duplicate in every location indicated by a rule (e.g., saving a copy of the attachment to both the sender defined target directory and the user defined target directory). Another example of avoiding conflicts between rules is to preferentially select rules in a particular order, storing the attachment according to the first rule that applies. In one embodiment of this, sender-defined rules 208 are applied in preference to user-defined rules 212, which in turn are applied in preference to a default rule 216.

Users may relocate attachments from the sender-defined directory by moving or copying the attachment to a different user selected directory 123. Any such relocation can be identified, tracked, and recorded by the file manager 125.

The user-defined processing rules 212 can also include a default rule 216 in the event that no other sender-defined or user-defined rules apply or have been created within the processing module 204. One example of a default 216 processing rule is a rule instructing that any received attachments are placed in a "New Attachments" directory within the user account 122.

Figure 3:
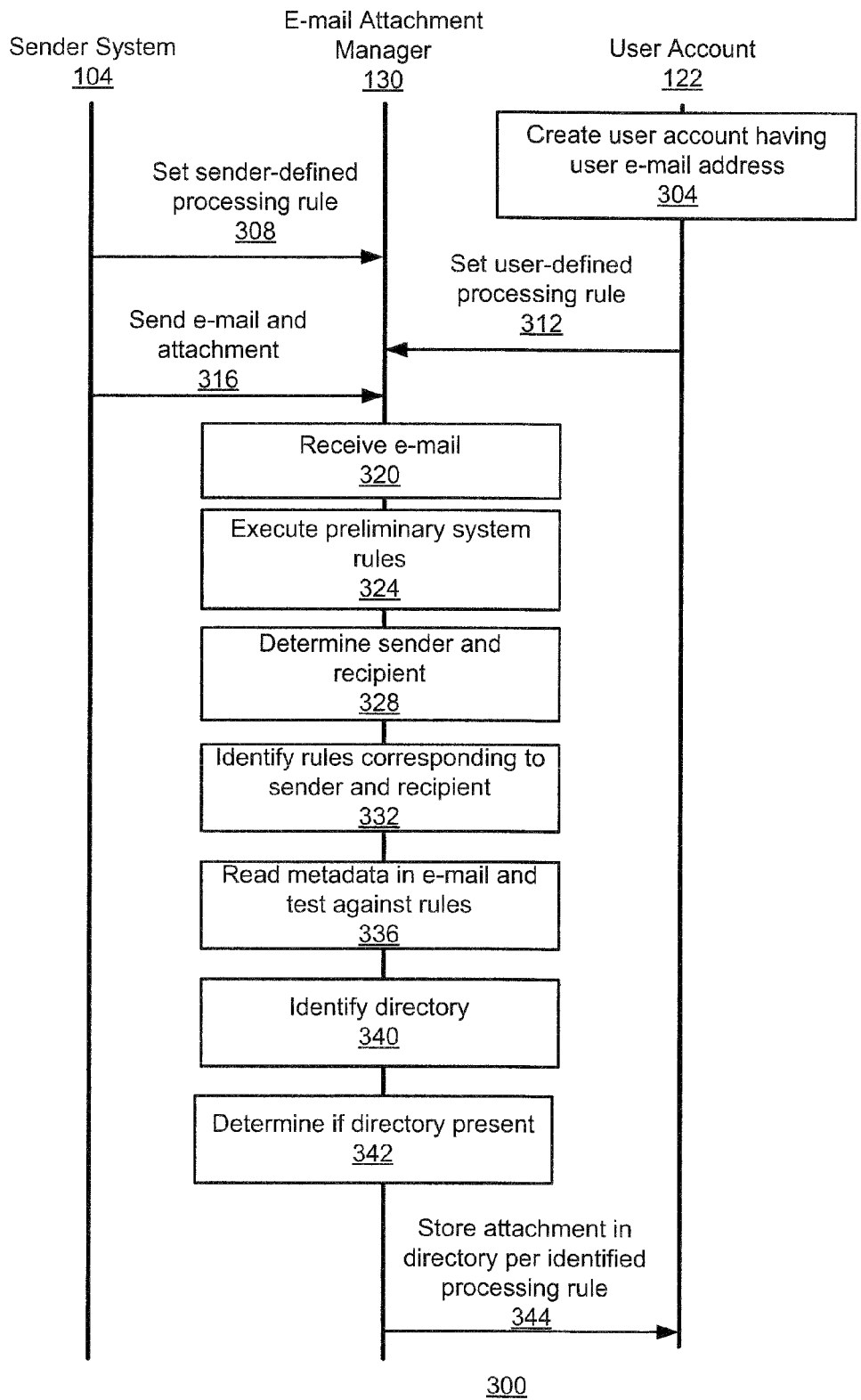
FIG. 3 is an interaction diagram illustrating a method of removing an attachment from an email and providing it to a user, according to one embodiment.

FIG. 3 illustrates one example method 300 of the various interactions that can occur to remove and store a received attachment according to a sender-defined 208 or user-defined 212 processing rule. A user account 122 is created 304 having an email address that, as described above, is to be used for the receipt of emails to the user conveying attachments to the file management system 120. The sender-defined processing rules are set 308, 312 as described above (this can occur either before or after the user account is created). As described above, the sender-defined processing rules 208 can be set through an API of the file management system 120 such that they can be applied to each user account 122 (e.g. User-X@fileaccess.com) in the file management system, thereby facilitating transmission of the attachments to all users.

At some point subsequent to the creation 308, 312 of the processing rules, the sender sends 316 an email with an attachment to the user. Upon receipt 320 of the email at the email server 128 and subsequent transfer to the email attachment manager 130, the attachment manager may execute 324 preliminary system rules testing the validity of the received email. Some example preliminary rules include determining whether the email includes an attachment or not, whether the recipient email address is valid, and whether the sender system 104 from which the email originates is authorized to provide emails to the user. Other preliminary rules can include the execution of spam filters, anti-virus protocols, and other security features. Should any of these preliminary rules identify a fault in the received email, the email can be rejected and a non-delivery notice provided to the sender.

Upon execution 324 of the preliminary rules, the email attachment manager 130 determines 328 the sender of the email and the recipient of the email. Either or both the sender and the recipient are used as a first step in the process of determining the rule (or rules) to apply to the attachment in order to save the attachment to a directory 123 within the user account 122. Upon determining 328 the sender and the recipient of the email, the email attachment manager 130 identifies 332 the processing rules corresponding to the sender and optionally the recipient. As described above, the rules can be sender-defined or user-defined. Upon identifying 332 the various rules for the sender and optionally the recipient, the email attachment manager 130 reads 336 the metadata in the email and tests the metadata against the identified rules in order to determine which of the identified rules to apply to appropriately store the email. As described above, a rule can be triggered by the sender's email address, domain, the title of the attachment, the type of attachment, a tag in the subject line or body of the email, the user's email address, and other criteria. As also mentioned above, the email attachment manager 130 can apply sender-defined rules 208 in preference to user-defined rules 212, or vice versa, in order to avoid conflicts, or resolve conflict rules according to any of a variety of methods.

Once the appropriate rule is determined, the email attachment manager 130 identifies 340 the appropriate directory 123, and determines 342 whether the directory already is present within the user account 122. If the directory 123 is already present, then the email attachment manager 130 stores 344 the attachment in the directory 123. If the directory is not already present, the email attachment manager automatically creates a directory 123 in order to store the attachment according to the rule, or stores the attachment in a default directory. Once the file is stored to the directory, the user can access the file, edit it, and share it with other users using the file sharing application 110, which then synchronizes the received attachments to such other user's devices.

However, in some cases a sender may send an email having an attachment to the recipient user without the sender having previously defined a processing rule 208. In these cases, the processing module 204 determines whether any user-defined processing rules 212 can be used to store the attachment in a directory 123 of the user account 122. In the absence of a user-defined processing rule 212, the processing module 204 stores the attachment in a default folder of the recipient user that can be designed either by the email attachment manager 130 or by the user. If the user has defined at least one rule 212, the processing module 204 applies the rule to test the email for the compliance with a condition and stores the attachment in a directory 123 contingent upon the condition, as described above. For cases in which multiple user-defined rules 212 conflict, the conflict can be resolved using some or all of the previously described resolution protocols.

The disclosure herein has been described in particular detail with respect certain embodiments of the invention. Those of skill in the art will appreciate that other embodiments may be practiced, and that various changes in form and details can be made therein without departing from the spirit and scope of the invention.

First, it should be noted that the language used in the specification has been principally selected for readability and instructional purposes, and may not have been selected to delineate or circumscribe the inventive subject matter. Thus, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Second, portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Third, reference to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

As set forth above, the file management system 120 is embodied in a computer system. This computer system may be specially constructed for the required purposes, or it may comprise a general-purpose computer selectively activated or reconfigured by one or more computer programs stored in the computer system. Such computer programs may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus accessible by one or processors. Accordingly, unless expressly stated otherwise, it is understood that throughout the description, terms such as "determining", "processing", "selecting" "accessing" or the like, refer to the action and processes of a computer system, or similar electronic computing device, that manipulates and transforms data represented as physical (electronic) quantities within the computer system memories or registers or other such information storage, transmission or display devices—and do not refer to mental steps made by a human being.

Finally, the embodiments disclosed herein are well suited to a wide variety of computer network systems over numerous topologies. Within this field, the configuration and management of large networks comprise storage devices and computers that are communicatively coupled to dissimilar computers and storage devices over a network, such as the Internet.

Accordingly, the disclosure herein is intended to be illustrative, but not limiting, of the scope of the invention, which is set forth in the following claims.

What is claimed is:

1. A computer-implemented method for processing email attachments in a file management system, comprising:
storing, by a processing circuitry, a plurality of processing rules for processing email attachments received from an external outbound mail server, including a plurality of sender-defined processing rules, each sender-defined processing rule provided by at least one email sender;
receiving by an inbound mail server, located in the file management system, by the processing circuitry, an inbound email from a user device of an email sender addressed to at least one user having an account on the file management system, the received email including an attachment and sent by the external outbound mail server, wherein the file management system is physically separated from the user device and physically separated from the external outbound mail server, and wherein the user device and external outbound mail server are both accessible to the inbound mail server via a communicatively coupled hardware network;
selecting from a plurality of email attachment processing rules, at least one sender-defined processing rule based upon the email sender of the received email;
processing, by the processing circuitry, the received email according to the at least one selected sender-defined processing rule to determine a target directory in the user's account in which to store the attachment included with the received email; and storing, by the processing circuitry, the attachment in the determined target directory in the user's account.

2. The computer-implemented method of claim 1, wherein the selected sender-defined processing rule specifies a variable target directory in which to store the attachment.

3. The computer-implemented method of claim 2, wherein the selected sender-defined processing rule uses email metadata in the received email to specify the variable target directory in which to store the attachment.

4. The computer-implemented method of claim 2, wherein the selected sender-defined processing rule uses a keyword associated with the received email to specify the user-specific variable target directory in which to store the attachment.

5. The computer-implemented method of claim 2, wherein the selected sender-defined processing rule uses a file type of the attachment to determine the user-specific variable target directory in which to store the attachment.

6. The computer-implemented method of claim 1, further comprising:

determining whether the target directory exists in the user's account;

responsive to the target directory not existing in the user's account, automatically creating the target directory in the user's account in which to store the attachment.

7. The computer-implemented method of claim 6, wherein the created directory is named based upon metadata in the received email.

8. The computer-implemented method of claim 6, wherein the created directory is named using an attachment title of the attachment of a received email.

9. The computer-implemented method of claim 6, wherein the created directory is named using a file type of the attachment of a received email.

10. The computer-implemented method of claim 1, wherein the selected sender-defined processing rule specifies a fixed target directory in a user's account in which to save the attachment.

11. The computer-implemented method of claim 10, wherein the selected sender-defined processing rule uses an email address of the sender to specify the user-specific fixed target directory in which to store the attachment.

12. The computer-implemented method of claim 10, wherein the selected sender-defined processing rule uses a domain of the sender to specify the user-specific fixed target directory in which to store the attachment.

13. The computer-implemented method of claim 1, further comprising:

storing a plurality of user-defined attachment processing rules provided by the user having the account at the file management system;

identifying one or more of the user-defined rules applicable to the received email based upon the email sender of the received email;

selecting at least one of the one or more user rules provided by the email sender in accordance with metadata provided in said received email; and processing the received email according to the at least one selected user rule.

14. The computer-implemented method of claim 13, further comprising moving the attachment from the target directory determined by a selected sender-defined rule to a directory determined by a selected user-defined rule.

15. The computer-implemented method of claim 13, further comprising a default processing rule specifying a default directory in which to store the attachment.

16. The computer-implemented method of claim 1, wherein the received email is addressed to a user email account associated with a domain of the file management system and configured only to receive emails.

17. The computer-implemented method of claim 1, wherein selected sender-defined processing rule specifies the target directory using plus addressing information in the email address of the user, the email address of the user including a name of a target directory.

18. The computer-implemented method of claim 1, further comprising providing an application programming interface configured to receive from an email sender a sender-defined processing rule.

19. A file management computer system, comprising:

a user account database configured to store a plurality of user directories, each user directory associated with a user having an account on the file management computer system;

an inbound email server located in the file management computer system and configured to receive, by processing circuitry, an inbound email from a user device of an email sender addressed to at least one user having an account on the file management computer system, the received email including an attachment and sent by an external outbound mail server, wherein the file management computer system is physically separated from the user device and physically separated from the external outbound mail server, and wherein the user device and external outbound mail server are both accessible to the inbound mail server via a communicatively coupled hardware network;

an email attachment manager configured, with the processing circuitry, to store a plurality of processing rules, the processing rules for processing email attachments, including a plurality of sender-defined rules provided by at least one email sender, the email attachment manager further configured, with the processing circuitry, to select from the plurality of processing rules, at least one sender-defined processing rule based upon the email sender of the received email, process, with the processing circuitry, the received email according to the at least one selected sender-defined processing rule to determine a target directory in the user's account in which to store the attachment included with the received email, and store, using the processing circuitry, the attachment in the determined target directory in the user's account.

20. A computer system comprising:

a computer processor; and a non-transitory computer-readable medium storing a computer program executable by the computer processor and performing actions comprising:

storing, by a processing circuitry, a plurality of processing rules for processing email attachment received from an external outbound mail server, including a plurality of sender-defined processing rules, each sender-defined processing rule provided by at least one email sender;

receiving by an inbound mail server, located in the file management system, by the processing circuitry, an inbound email from a user device of an email sender addressed to at least one user having an account on the file management system, the received email including an attachment and sent by the external outbound mail server, wherein the file management computer system is physically separated from the user device and the external outbound mail server, and wherein the user device and external outbound mail server are both accessible to the inbound mail server via a network connection;

selecting from a plurality of email attachment processing rules, by the processing circuitry, at least one sender-defined processing rule based upon the email sender of the received email;

processing the received email, by the processing circuitry, according to the at least one selected sender-defined processing rule to determine a target directory in the user's account in which to store the attachment included with the received email; and storing the attachment in the determined target directory in the user's account, by the processing circuitry.

\* \* \* \* \*